United States Patent
Siegel et al.

(10) Patent No.: US 6,625,610 B1
(45) Date of Patent: Sep. 23, 2003

(54) METHOD AND APPARATUS FOR ACCESSING TRANSACTION SERVICES USING OBJECT LINKING AND EMBEDDING

(75) Inventors: Frank Siegel, Redwood City, CA (US); Russel Smith, Campbell, CA (US); David J. Cooper, Sunnyvale, CA (US); Bill Culman, Scotts Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/488,045

(22) Filed: Jan. 20, 2000

Related U.S. Application Data

(62) Division of application No. 08/993,216, filed on Dec. 18, 1997, now Pat. No. 6,035,301.
(60) Provisional application No. 60/034,321, filed on Dec. 20, 1996.

(51) Int. Cl.⁷ .............................................. G06F 17/30
(52) U.S. Cl. ........................... 707/102; 707/4; 717/165
(58) Field of Search ............................... 707/102, 103, 707/4; 709/203, 219, 315; 717/108, 109, 165

(56) References Cited

U.S. PATENT DOCUMENTS

| | | | |
|---|---|---|---|
| 5,363,121 A | | 11/1994 | Freund |
| 5,752,027 A | | 5/1998 | Familiar |
| 5,754,772 A | | 5/1998 | Leaf |
| 5,768,587 A | | 6/1998 | Freund et al. |
| 5,854,750 A | | 12/1998 | Phillips et al. |
| 5,857,100 A | | 1/1999 | Phillips et al. |
| 5,870,088 A | | 2/1999 | Washington et al. |
| 5,890,161 A | | 3/1999 | Helland et al. |
| 6,442,618 B1 | * | 8/2002 | Phillips et al. .............. 709/315 |

* cited by examiner

*Primary Examiner*—Jean R. Homere

(57) ABSTRACT

A methods and apparatus for providing an OLE automation interface to transactions services is provided. The method and apparatus includes an OLE/TP gateway. The OLE/TP gateway dynamically creates OLE objects that correspond to one or more transaction services. Client programs manipulate the methods and properties included in the OLE objects to perform transactions involving the transaction services. The present invention also includes a visual development environment that allows the user to visually select the type of OLE objects that the OLE/TP gateway makes available to client programs.

12 Claims, 3 Drawing Sheets

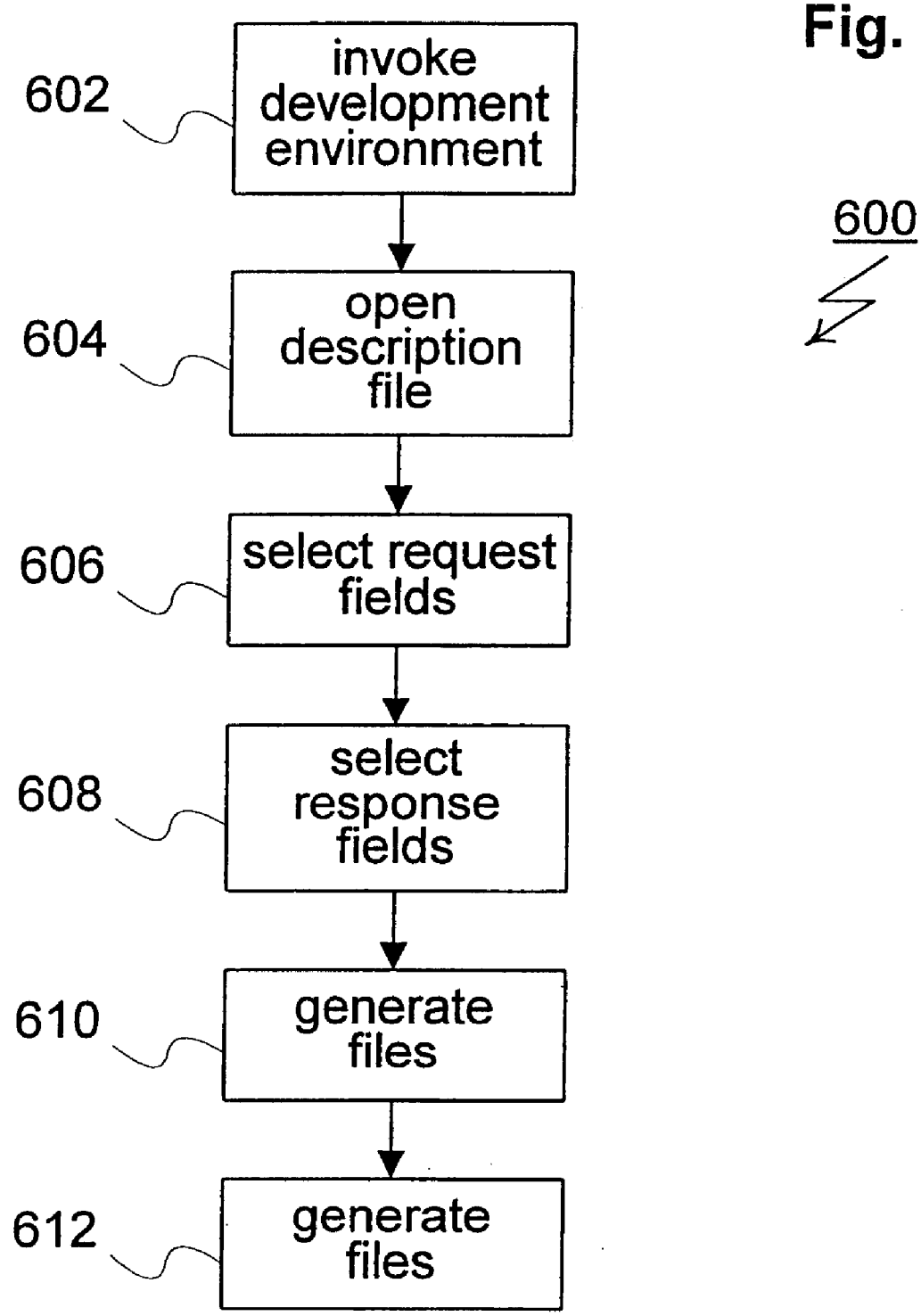

METHOD AND APPARATUS FOR ACCESSING TRANSACTION SERVICES USING OBJECT LINKING AND EMBEDDING

This is a division of application Ser. No. 08/993,216, filed Dec. 18, 1997, now U.S. Pat. No. 6,035,301, which claims the benefit of U.S. Provisional Application No. 60/034,321, filed Dec. 20, 1996.

FIELD OF THE INVENTION

The present invention relates generally to software tools for use with transaction processing systems. More specifically, the present invention is a method and apparatus for using object linking and embedding (OLE) to access online transaction processing (OLTP) systems.

BACKGROUND OF THE INVENTION

Online transaction processing (OLTP) systems are computer systems that are designed to provide controlled access to transaction protected resources, such as databases. In OLTP systems, a transaction protected resource may only be accessed or modified as part of a "transaction." A transaction is defined as a unit of work that has "ACID" properties. "ACID" properties means that a transaction is 1) "atomic," 2) "consistent," 3) "isolated," and 4) "durable." To initiate a transaction, a client program performs a "begin transaction" operation. Subsequently, the client program accesses and potentially modifies one or more protected resources. At the end of the transaction, the client program executes either a "commit transaction" or an "abort transaction" operation.

Increasingly, OLTP systems are constructed using a client/server architecture where client programs, located on client computers, interact with server programs located on server computers. In this type of OLTP system, the server programs act as interfaces to transaction protected resources. Each server program is subdivided into one or more services. Each service is a portion of the server program that has been created to perform a specific type of transaction. For example, a service might be created to register new cars, or to move funds between bank accounts. Client programs access services by sending request messages to the appropriate server program. When required, a reply message is generated by the service and sent by the server program to the requesting client program.

In many client/server OLTP systems, the interaction between client and server programs is coordinated by a transaction processing monitor or TP monitor. TP monitors are programs that function as transaction middlemen between client programs and server programs. To access a protected resource, a client program sends a message to the TP monitor responsible for the protected resource. The TP monitor forwards the message to the appropriate server program. The TP monitor also forwards any result message generated by the server program to the requesting client program. Use of a TP monitor ensures that the "ACID" properties required by the transaction abstraction are maintained. Examples of TP monitors include Nonstop Tuxedo and Pathway/TS of Tandem Computers Inc., and CICS of IBM.

Personal computers are commonly used as client systems in OLTP systems. Typically, these computers use the Microsoft Windows® operating system. Windows® includes an object oriented method for program interaction known as object linking and embedding (OLE). Using OLE, programs may be configured to export object oriented interfaces to their internal methods. For example, a word processor may be configured to provide an object oriented interface to its spell checker. A program that exports this type of object oriented interface is known as an OLE server. Programs known as OLE clients use the object oriented interface provided by OLE servers to access the servers' internal methods. Thus, an OLE client can use the spell checker of a word processor configured as an OLE server.

Much of the power of the OLE system stems from OLE's widespread use. In effect, configuration of a program as an OLE server makes the program's internal methods available to a wide range of existing OLE clients. Unfortunately, configuration of OLTP systems as OLE servers is problematic. This difficulty stems largely from the fact that the type of services provided by an OLTP system depend largely on the particular resource that the OLTP system is protecting. For example, the services included in an ATM network vary greatly from the services included in a payroll system. As a result, a different set of OLE objects may be required for each instance of an OLTP system. The unfortunate result is that it is more practical to provide OLTP systems without OLE interfaces than it is to build specialized OLE interfaces for each OLTP system. Thus, a need exists for a system that allows OLTP systems to be accessed from OLE clients.

SUMMARY OF THE INVENTION

The present invention includes a method and apparatus for providing OLE interfaces to OLTP systems. A preferred environment for the present invention includes an OLTP system having one or more server systems and one or more personal computers systems. The OLTP system includes one or more server programs that are responsible for one or more transaction protected resources. The OLTP system also includes a TP monitor that may be selected from a range of available TP monitors including Tuxedo, Pathway/TS and CICS TP monitors.

The server programs included in the OLTP system provide one or more "services." Each service is a function that the server programs performs for client programs. Typically, these services are tailored to reflect the transaction protected resources associated with the server programs. For example, server programs associated with employee databases typically provide services for accessing and changing individual employee records. In comparison, server programs used in ATM networks Atypically provide services for depositing and withdrawing money. Client programs access the services provided by the server programs by sending request messages to the TP monitor. The TP monitor forwards the request messages to the appropriate server programs and services. The server programs respond by sending reply messages to TP monitor. In turn, the TP monitor forwards the reply messages to the requesting client programs.

The present invention includes a visual OLE/TP development environment and an OLE/TP runtime environment. Using the OLE/TP development environment, the programmer defines one or more objects. Each object corresponds to one of the services provided by a server program. For example, a server program for an employee database would generally provide a service for accessing individual employee records. In this case, an employee object may be defined to correspond to the record access service. Each object may include one or more properties. Each object also includes methods, or procedures, that operate on they object. For each object, these methods include a begin transaction method, a commit transaction method and an abort transaction method.

Once the desired objects have been defined, the OLE/TP development environment creates an OLE type file containing OLE definitions for each created object. The objects defined in the OLE type file are part of an object hierarchy. At the top level of the object hierarchy, the OLE/TP development environment creates a special object known as an OLE/TP gateway object. Optionally, the OLE development environment may also create sample or skeleton code in a variety of languages such as C++ or Visual Basic. The sample code includes exemplary uses of each object defined.

The programmer then creates a client program that uses the objects that were defined in the OLE/TP development environment. This program may be created from scratch, or by modifying the sample code produced by the OLE/TP development environment. The client program may also be created as part of an existing application, such as a spreadsheet or desktop publishing application.

At runtime, the client program creates an instance of the OLE/TP gateway object. Creation of the OLE/TP gateway object initializes communications between the client program and the TP monitor. The client program then creates and manipulates one or more of the objects included in the OLE type library. For example, to access the database of employee records, the client program would create an employee object. The client program then uses the created object to perform transactions. More specifically, to perform a transaction, the client program calls a created object's begin transaction method. Subsequently, the client program accesses and, in some cases modifies, one or more of the object's properties. To complete the transaction, the client program calls the object's commit transaction or abort transaction methods. In this way, the present invention provides an OLE interface to OLTP systems.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 6 is a flowchart showing the steps associated with the use of the visual development environment provided by an embodiment of the present invention.

DETAILED DESCRIPTION OF THE PREFERRED EMBODIMENTS

Reference will now be made in detail to preferred embodiments of the invention, example's of which are illustrated in the accompanying drawings. Wherever possible, the same reference numbers will be used throughout the drawings to refer to the same or like parts.

ENVIRONMENT

Figure 1:
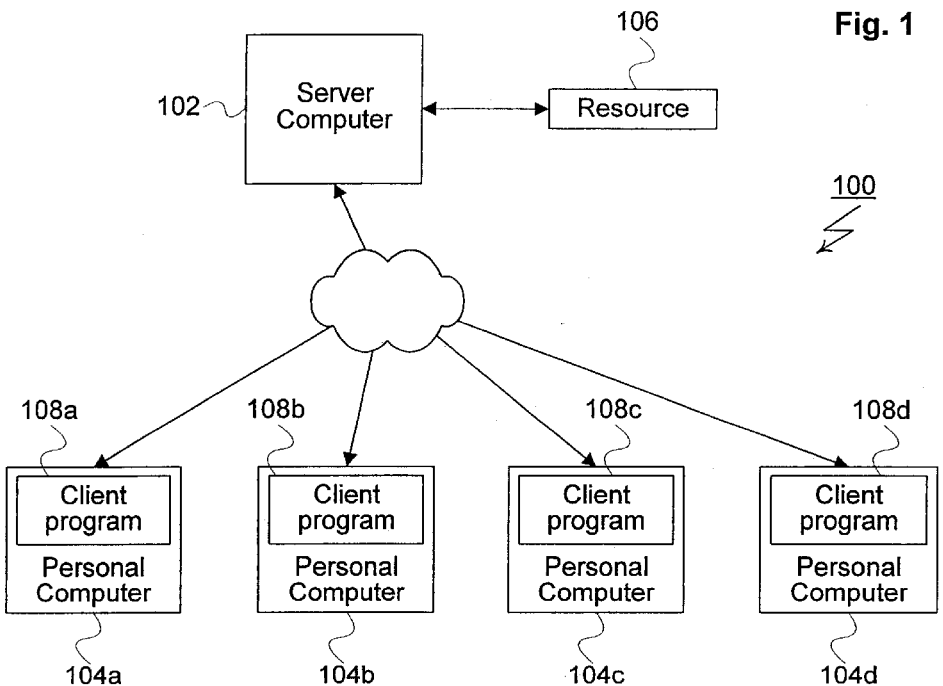
FIG. 1 is a block diagram of an online transaction processing system (OLTP system) shown as a representative environment for the present invention.

In FIG. 1, an online transaction processing system (OLTP system) 100 is shown as a representative environment for the present invention. OLTP system 100 includes a server computer 102 that may be selected from a wide range of suitable computer types. OLTP system 100 also includes a series of personal computer systems, of which personal computer systems 104a through 104d are representative. Personal computer systems 104 may be any suitable type including personal computers using the Windows® operating system. In general, although OLTP system 100 is shown as a combination of a single server computer 102 and multiple personal computer systems 104, it is to be appreciated that a wide range of network topologies and architectures are equally practical.

Server computer 102 is the server within OLTP system 106 for a transaction protected resource 106. Transaction protected resource 106 may be any object, such as a database, for which ACID transaction properties are desired. In FIG. 1, a single transaction protected resource 106 is shown. OLTP system 100 may, however, include any number of transaction protected resources 106. Personal computer systems 104 are hosts for respective client programs 108. Client programs 108 are included are shown as representative clients of transaction protected resource 106.

Pathway/TS OLE/TP Gateway

Figure 2:
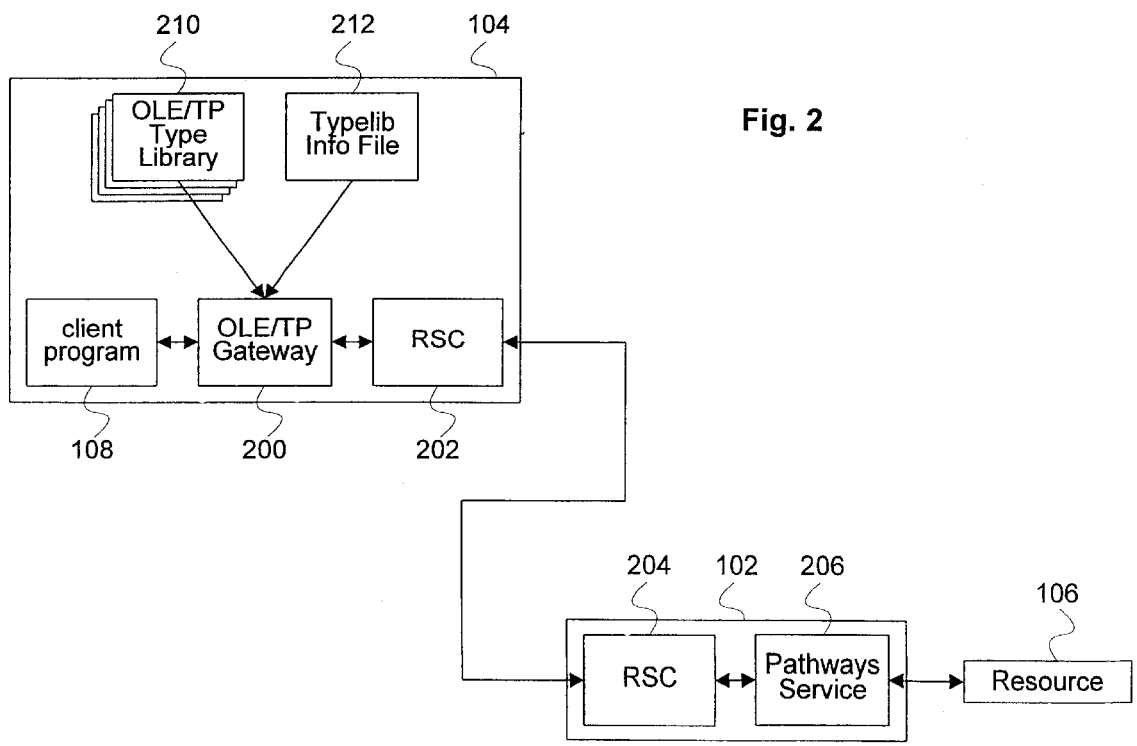
FIG. 2 is a block diagram showing the OLE/TP gateway of an embodiment of the present invention, deployed in a Pathway/TS transaction environment.

An embodiment of the present invention includes a method and apparatus that allows client programs 108 to use OLE automation to access transaction protected resource 106. Use of this method and apparatus in a Pathway/TS environment is more easily appreciated by reference to FIG. 2. In FIG. 2, it may be seen that client program 108 uses a series of intermediate processes to access transaction protected resource 106. This series of processes starts in personal computer 104 with an OLE/TP gateway 200 followed by an RSC (Remote Server Call) process 202. The series of processes continues in server computer system 102 with an RSC process 204 followed by a Pathway/TS service 206.

Pathway/TS service 206 is a portion of a larger Pathway/TS server process (not shown). Pathway/TS service 206 is designed to perform a specific transaction, such as registering new cars, or moving funds between bank accounts. In FIG. 2, a single Pathway/TS service 206 is shown. OLTP system 100 may, however, include any number of Pathway/TS services 206. Processes perform transactions involving transaction protected resource 106 by invoking Pathway/TS service 206.

RSC processes 202 and 204 communicate to extend the presence of Pathway/TS service 206 to personal computer system 104. This allows client processes located in personal computer system 104 to behave as if they were located in server computer system 102. Client processes use an API (application programming interface) provided by RSC processes 202 to communicate with Pathway/TS service 206. RSC process 202 transforms the calls to this API into communications to RSC process 204. RSC process 204, in turn, performs appropriate manipulations of Pathway/TS service 206. RSC process 204 sends responses generated by Pathway/TS service 206 to RSC process 202. RCS process 202 translates these responses into result codes usable by client processes. RSC processes 202 and 204 may be interconnected using a wide range of networking technologies such as TCP/IP, NETBIOS, or asynchronous communications lines.

OLE/TP gateway 200 provides a set of OLE objects that correspond to Pathway/TS service 206. Application program 108 manipulates these objects to perform transactions involving Pathway/TS service 206 and transaction protected resource 106. OLE/TP gateway 200 translates the object manipulations of client program 108 into calls to the API of RSC process 202. RSC process 202 translates these API calls into appropriate communications sent to RSC process 204. RSC process 204 then translate these communications into appropriate manipulations of Pathway/TS service 206. Effectively, the OLE object manipulations performed by client program 108 become transactions involving Pathway/TS service 206 and transaction protected resource 106.

Figure 3:
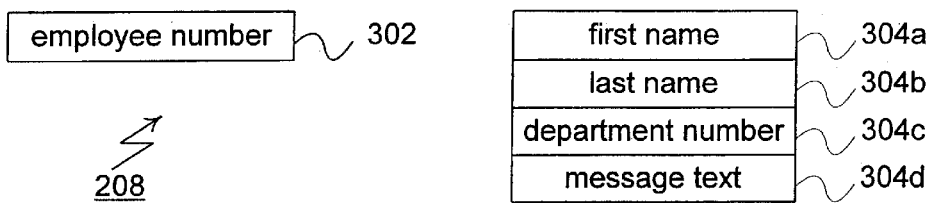
FIG. 3 is a block diagram of an exemplary Pathway/TS service.

The OLE objects provided by OLE/TP gateway 200 are more easily described if a specific embodiment is provided for Pathway/TS service 206. For this reason, FIG. 3 shows an exemplary embodiment of Pathway/TS service 206 that includes a request 302 and an associated set of responses 304a through 304c. Request 302 corresponds to an employee number. Responses 304a through 304c correspond to an employee first name, employee last name, employee department number and a message string, respectively.

Figure 4:
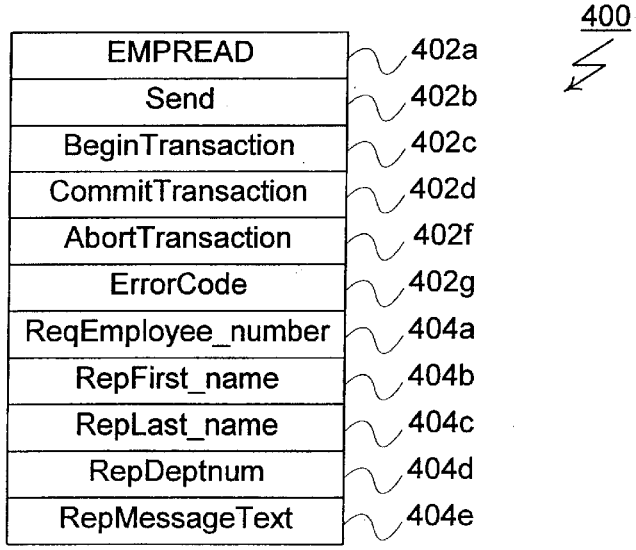
FIG. 4 is a block diagram of a dynamic service level object that corresponds to the Pathway/TS service of FIG. 3 as provided by an embodiment of the present invention.

FIG. 4 shows the OLE object provided by OLE/TP gateway 200 for the exemplary Pathway/TS service 206 of FIG. 3. EMPREAD object 400 includes a series of methods 402a through 402f and a series of properties 404a through 404e. Method 402a (EMPREAD) is a special method that allows EMPREAD object 400 to be dynamically created by OLE/TP gateway 200. Dynamic creation of objects will be described in following sections of this document. Methods 402b through 402f (Send, BeginTransaction, CommitTransaction, AbortTransaction, and ErrorCode, respectively) are transaction oriented methods. Specifically, method 402b (Send) causes EMPREAD object 400 to send itself to Pathway/TS service 206. Method 402c (BeginTransaction) causes EMPREAD object 400 to initiate a new transaction with Pathway/TS service 206. Method 402d (CommitTransaction) causes EMPREAD object 400 to commit a pending transaction with Pathway/TS service 206. Method 402e (AbortTransaction) causes EMPREAD object 400 to abort a pending transaction with Pathway/TS service 206. Finally, method 402f causes EMPREAD object 400 to return the error code associated with an immediately preceding use of methods 402b through 402f.

Properties 404a through 404e correspond to the request 302 and the responses 304 included in the exemplary Pathway/TS service 206 of FIG. 3. More specifically, property 404a (ReqEmployee_number) corresponds to request 302 (employee number). Property 404b (RepFirst_Name) corresponds to response 304a (first name). Property 404c (RepLast_Name) corresponds to response 304b (last name). Property 404d (RepDeptnum) corresponds to response 304c (department number). Finally, property 404e (RepMessageText) corresponds to response 304d (message text).

Figure 5:
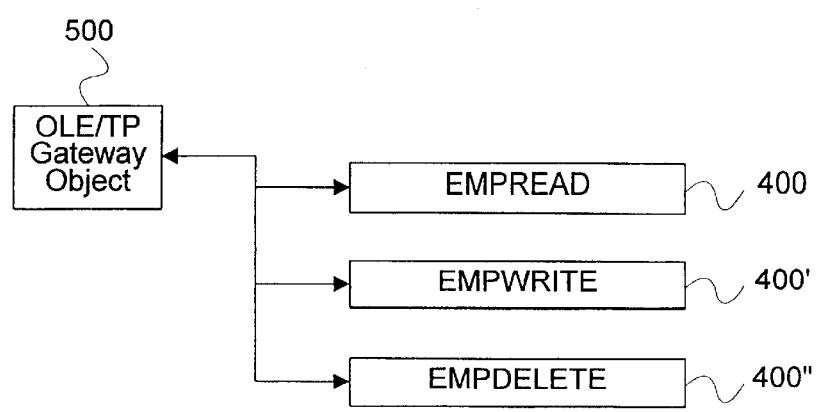
FIG. 5 is a block diagram of an object hierarchy as included in OLE/TP gateway of an embodiment of the present invention.

The OLE objects provided by OLE/TP gateway 200 are organized into a hierarchy of two levels. As shown in FIG. 5, the top level of this hierarchy is formed by an OLE/TP gateway object 500. This level of the hierarchy is known as the gateway level. All other objects are included in the next lower hierarchical level. This level is known as the dynamic service level. In the case of FIG. 5, the dynamic service level includes EMPREAD object 400, as well as EMPWRITE object 400' and EMPDELETE object 400".

To manipulate Pathway/TS service 206 and transaction protected resource 106, client program 108 first creates an instance of OLE/TP gateway object 500. Once OLE/TP gateway object 500, has been created, client program 108 uses OLE/TP gateway 200 to dynamically allocate service level objects 400. Client program 108 then uses the methods 402 and properties included in service level objects 400 to manipulate Pathway/TS service 206.

Dynamic Object Creation

Dynamic creation of service level objects 400 requires that OLTP system 100 posses several types of information. For the embodiment of FIG. 2, this information is stored in OLE/TP type library 208 and Typelib info file 210. OLE/TP type library 208 includes one definition for each service level object 400. Preferably, each definition is stored as a separate file within OLE/TP library 208. This type of implementation means that OLE/TP library 208 includes one file for each service level object 400. Each file includes information that describes the methods 402 and properties 404 of a particular service level object 400. Preferably, this information is stored as an OLE typeinfo.

Typelib info file 210 includes information that provides a mapping between service level objects 400 and the files included in OLE/TP library 208. This mapping allows OLE/TP gateway 200 to locate the file within OLE/TP type library 208 that corresponds to a given service level object 400.

Typelib info file 210 also includes information that allows methods 402 and properties 404 of service level objects 400 to interact with RSC process 202. More specifically, to interact with RSC process 202, processes use a request buffer and a reply buffer. Messages being sent by RSC process 202 are placed in the request buffer. Messages received by RSC process 202 are included in the reply buffer. Data items sent by RSC process 202 must be placed at a specific offset within the request buffer. Likewise, data items that are retrieved by RSC process 202 must be extracted from a specific offset within the reply buffer. Typelib info file 210 includes information that describes the offsets within the request buffer and reply buffer that are relevant to methods 402 and properties 404 of service level objects 400. For example, in the case of property 404a (ReqEmployee_number) of service level object 400, Typelib info file 210 includes information describing an offset in the request buffer. The described offset is the offset where an employee number must be placed to access Pathway/TS service 206 using RSC process 202. In the case of property 404c (RepLast_name) of service level object 400, Typelib info file 210 includes information describing an offset in the reply buffer. The described offset is the offset where an employee's last name may be retrieved after using by RSC process 202 to access Pathway/TS service 206.

OLE/TP gateway 200 is preferably implemented so that the information included in OLE/TP library 208 and Typelib info file 210 is used for dynamic creation and use of service level objects 400. This is accomplished by including a gateway level OLE IDispatch interface in OLE/TP gateway 200. The gateway level IDispatch interface is associated with gateway object 500. As a result, the gateway level IDispatch interface is invoked each time a service level object 400 is executed (service level objects 400 are methods of gateway object 500).

OLE gateway 200 includes implementations for OLE functions GetIDsOfNames and Invoke as part of the gateway level IDispatch interface. The OLE environment causes these functions to be called, in order, each time a service level object 400 is invoked. During the first invocation of a service level object 400, the GetIDsOfNames function searches the Typelib info file 210. The object of this search is to locate the name of the file in OLE/TP library 208 that corresponds to the service level object 400 being invoked. Once this file is located, GetIDsOfNames opens the file and creates a dynamic service level object 400 using the typeinfo included in the file. GetIDsOfNames also retrieves the RSC specific information included in Typelib info file 210 that corresponds to the service level object 400 being invoked. GetIDsOfNames stores this information in the newly created dynamic service level object 400. GetIDsOfNames then returns a member ID that corresponds to the created dynamic service level object 400.

Invoke is then called with the returned member ID as an argument. Invoke locates the dynamic service level object 400 and returns its IDispatch pointer. The IDispatch pointer is a virtual function table that includes information about the properties and methods of the newly created service level object 400. Subsequently, the newly created service level object 400 is accessed using this IDispatch pointer.

Communication With Pathway/TS Server

Client program 108 uses the methods 402 and properties 404 of service level objects 400 to manipulate Pathway/TS service 206 and transaction protected resource 106. This means that methods 402 and properties 404 must interact with RSC process 202. OLE/TP gateway 200 is preferably implemented so that the information included in Typelib info file 210 is used during this interaction. This is accomplished by including a dynamic service level OLE IDispatch interface in OLE/TP gateway 200. The dynamic service level IDispatch interface is associated with service level objects 400. As a result, the dynamic service level IDispatch interface is invoked each time a method 402 or property of a service level object 400 is executed.

OLE gateway 200 includes implementations for the OLE function Invoke as part of the dynamic service level IDispatch interface. The OLE environment causes this function to be called each time a method 402 or property 404 of a service level object 400 is executed. When called, Invoke first determines if a method 402 or property 404 is being executed. For methods 402, Invoke translates the property being called into a corresponding procedure call included in the API of RSC process 202. For properties 404, Invoke retrieves the RSC specific information stored in the underlying service level object 400 (see the preceding description of dynamic object creation). Invoke then uses this information to access the correct location in the request buffer or reply buffer.

EXAMPLE

To manipulate Pathway/TS service 206 and transaction protected resource 106, client program 108 creates an instance of OLE/TP gateway object 500. Creation of OLE/TP gateway object 500 launches OLE/TP gateway 200. Once OLE/TP gate way object 500, has been created, client program 108 may access lower level object 400. OLE/TP gateway 200 responds to the first access of this type by dynamically creating an instance of service level object 400.

Subsequently, client program 108 accesses service level object 400. Once created, client program 108 uses the methods 402 and properties of 404 of service level object 400 to perform transactions involving Pathway/TS service 206 and transaction protected resource 106. The following Visual Basic code fragment illustrates creation and use of OLE/TP, gateway object 500 and service level object 400:

MyObj=CreateObject ( "Olegwyp")
Set ReadObj=MyObj.EMPREAD
ReadEmpObj.ReqEmployee_number=33
ReadEmpObj.Send
Print ReadEmpObj.RepLast_name In the preceding code fragment, the statement "MyObj= CreateObject ("Olegwyp")" is used to create OLE/TP gateway object 500 and launch OLE/TP gateway 200. The following statement, Set ReadObj=MyObj.EMPREAD, creates service level object 400. Property 404a (ReqEmployee_number) is then set to the value of thirty-three by the statement ReadEmpObj.ReqEmployee_number=33. The ReadEmpObj.Send statement sends service level object 400 to Pathway/TS service 206. This causes Pathway/TS service 206 to perform a transaction using the ReqEmployee_number of thirty-three. During this transaction, Pathway/TS service 206 initializes properties 404b through 404e of service level object 400 to values that correspond to the employee having the employee number thirty-three. This allows the employee's last name to be printed in the following line "Print ReadEmpObj.RepLast_name."

OLE/TP Development Environment

The present invention includes a visual OLE/TP development environment. Use of the visual development environment in combination with a Pathway/TS TP monitor is best appreciated by reference to FIG. 6. In FIG. 6, a method for creating an OLE interface to OLTP system 100 is shown and generally designated 600. Method 600 begins with step 602 where the user invokes the visual OLEITP development environment. Preferably, the visual OLE/TP development environment executes on personal computer systems 104 and is compatible with the interfaces provided by such systems. For example, in the case where personal computer systems 104 use the Windows 95® operating system, the visual OLE/TP development environment would be compatible with the Windows 95® environment and user interface.

In step 604, the user uses the visual OLE/TP development environment to select a file that describes the fields included in Pathway/TS service 108. In cases where a Pathway/TS TP monitor, a DDL dictionary is opened. The DDL dictionary uses Data Definition Language (DDL) to describe the requests and responses that are included in Pathway/TS service 108. Once opened, the visual OLE/TP development environment displays the requests and responses that are included in Pathway/TS service 108.

In step 606, the user begins the process of defining an object that will correspond to one of the services 110 included in the OLTP system 100. More specifically, to begin this process, the user selects two groups of fields from the fields included in the display of the visual OLE/TP development environment. The first of these groups are the fields that correspond to the request message required by the selected service 110. In step 606 the user highlights, or otherwise selects these fields.

In step 608, the user selects.the second group of fields from the fields included in the display of the visual OLE/TP development environment. The second group includes the fields that correspond to the reply message generated by the selected service 110. In step 608 the user highlights, or otherwise selects these fields.

In step 610, the user instructs the visual development to perform file generation. In response, the visual development environment generates a series of output files. The output files include a file that will become part of OLE/TP type library 208. The file includes a typeinfo that describes a dynamic service level object 400 that corresponds to the request and reply fields selected by the user. The visual development environment also updates typelib info file 210 to include a mapping that allows OLE/TP gateway 200 to locate the file being added to the OLE/TP type library 208. Typelib info file 210 is also updated to include any RSC specific information that may be required to allow methods 402 and properties 404 of the newly created dynamic service level object 400 to communicate with RSC process 202.

Step 612 is an optional step performed at the user's request. In step 612, the visual development produces sample or skeleton code that demonstrates use of the newly created newly created dynamic service level object 400 and gateway object 500. The sample code may be produced in a number of high level languages such as Visual C++, Visual Basic, PowerBuilder or Visual SQL.

The preceding descriptions, both of the OLE/TP gateway and visual development environment have focused on the use of the Pathway/TS TP monitor. It should be appreciated, however, that the same technology may be adapted to other environments. Thus, it is possible, without significant deviation to provide embodiments of the present invention that support use of other TP monitors such as Tuxedo or CICS.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. An apparatus for creating a definition for a dynamic service level object corresponding to a transaction service, the apparatus including:
   a file selection portion, the file selection portion configured to allow a user to open a file containing a description of the transaction service;
   a field selection portion, the field selection portion configured to allow a user to select a request field and one or more response fields included in the description of the transaction service; and
   a generation portion, the generation portion configured to create the definition for the dynamic service level object, the definition for the dynamic service level object including definitions for one or more methods and one or more properties corresponding to the transaction service.

2. An apparatus as recited in claim 1 wherein the definition for the dynamic service level object includes a respective property for each request field and response field selected by the user.

3. An apparatus as recited in claim 1 wherein the definition for the dynamic service level object includes begin transaction, commit transaction and abort transaction methods.

4. An apparatus as recited in claim 1 wherein the generation portion is configured to create the definition for the dynamic service level object as an OLE typeinfo.

5. A computer program product comprising:
   a computer usable medium having computer readable code embodied therein for creating a definition for a dynamic service level object corresponding to a transaction service, the computer program product comprising:
      first computer readable program code devices configured to cause a computer to allow a user to interactively open a file containing a description of the transaction service;
      second computer readable program code devices configured to cause a computer to allow a user to interactively select a request field and one or more response fields included in the description of the transaction service; and
      third computer readable program code devices configured to cause a computer to create the definition for the dynamic service level object, the definition for the dynamic service level object including definitions for one or more methods and one or more properties corresponding to the transaction service.

6. A computer program product as recited in claim 5 wherein the definition for the dynamic service level object includes a respective property for each request field and response field selected by the user.

7. A computer program product as recited in claim 5 wherein the definition for the dynamic service level object includes begin transaction, commit transaction and abort transaction methods.

8. A computer program product as recited in claim 5 wherein the third computer readable program code devices are configured to cause a computer to create the definition for the dynamic service level object as an OLE typeinfo.

9. A method for creating a definition for a dynamic service level object corresponding to a transaction service, the method comprising the steps of:
   allowing a user to interactively open a file containing a description of the transaction service;
   allowing a user to select a request field and one or more response fields included in the description of the transaction service; and
   creating the definition for the dynamic service level object, the definition for the dynamic service level object including definitions for one or more methods and one or more properties corresponding to the transaction service.

10. A method as recited in claim 9 wherein the definition for the dynamic service level object includes a respective property for each request field and response field selected by the user.

11. A method as recited in claim 9 wherein the definition for the dynamic service level object includes begin transaction, commit transaction and abort transaction methods.

12. A method as recited in claim 9 wherein the definition for the dynamic service level object is an OLE typeinfo.

* * * * *